United States Patent [19]

Katayama

[11] Patent Number: 5,001,379
[45] Date of Patent: Mar. 19, 1991

[54] SMALL-SIZED ELECTRIC MOTOR

[75] Inventor: Koji Katayama, Himeji, Japan

[73] Assignee: Mitsubishi Denki Kabushiki Kaisha, Tokyo, Japan

[21] Appl. No.: 394,444

[22] Filed: Aug. 16, 1989

[30] Foreign Application Priority Data

Aug. 17, 1988 [JP] Japan .......................... 63-107933[U]
Sep. 14, 1988 [JP] Japan ............................... 63-230806

[51] Int. Cl.⁵ ...................... H02K 11/00; H02K 3/46; H02K 1/12
[52] U.S. Cl. .................................... 310/194; 310/71; 310/254
[58] Field of Search .................. 310/40 MM, 71, 179, 310/180, 181, 194, 254; 336/192

[56] References Cited

U.S. PATENT DOCUMENTS

| 3,634,878 | 1/1972 | Davis | 336/192 |
|---|---|---|---|
| 3,739,312 | 6/1973 | Knebel | 336/192 |
| 3,979,615 | 9/1976 | Neff | 310/71 |
| 4,720,646 | 1/1988 | Torimoto | 310/194 |
| 4,849,588 | 7/1989 | Itoh et al. | 310/194 |

FOREIGN PATENT DOCUMENTS

| 2412545 | 9/1974 | Fed. Rep. of Germany | 310/40 MM |
|---|---|---|---|
| 0074212 | 7/1978 | Japan | 310/40 MM |
| 0194548 | 11/1984 | Japan | 310/40 MM |

Primary Examiner—Steven L. Stephan
Assistant Examiner—C. LaBalle
Attorney, Agent, or Firm—Sughrue, Mion, Zinn, Macpeak & Seas

[57] ABSTRACT

An electric motor comprising a rotor having a permanent magnet and a stator having a stator coil disposed around the rotor. The electric motor also comprises a coil bobbin having a flange portion at opposite ends of a cylindrical body portion, one of the flange portions having a groove in which an insertion groove for inserting a coil terminal therein and other flange portion having a coil terminal engaging portion. The electric motor also comprises a coil terminal having one end engaged with the engaging portion and the other end connected to an external connection terminal, and a stator coil which is wound on the bobbin and connected between the coil terminal bend turn portion and the engaging end portion.

8 Claims, 4 Drawing Sheets

FIG. I

SMALL-SIZED ELECTRIC MOTOR

BACKGROUND OF THE INVENTION

This invention relates to an electric motor and more particularly to a small-sized electric motor stator.

In a conventional small-sized electric motor stator, a coil terminal for connecting an end of a coil conductor to an external circuit is attached at its one end to a bobbin and is bent to extend across the outer circumference of the coil so that no physical external force is applied to the coil due to the deformation of the coil terminal and that the connection to the external connecting terminal is easy.

However, in the conventional small-sized electric motor stator of the above-described construction, the coil cannot be automatically wound by an automatic machine because the coil terminal extends across the outer circumference of the coil. Also, winding the coil end around the coil terminal cannot be achieved by an automatic machine. Therefore, the connection between the coil end and the coil terminal had to be established by attaching the coil terminal to the bobbin after the coil is wound around the bobbin and then winding the coil end around the coil terminal and soldered. Therefore, due to the deformation of the coil terminal, the distance of it from the coil can be changed, where an external force may be exterted upon the coil and the coil conductor may be broken. Also, a play may be easily generated between the coil terminal and the bobbin, making the coil winding operation instable.

SUMMARY OF THE INVENTION

Accordingly, one object of the present invention is to provide an electric motor free from the above discussed problems of the conventional motor.

Another object of the present invention is to provide an electric motor in which the coil winding operation can be more easily and reliably achieved.

Another object of the present invention is to provide an electric motor in which the reliability of the product quality can be increased and the manufacturing cost can be reduced.

A further object of the present invention is to provide an electric motor in which the breaking of the coil conductor can be prevented.

With the above objects in view, according to the present invention, the electric motor, which includes a rotor having a permanent magnet and a stator having a stator coil disposed around the rotor, comprises a bobbin having a flange portion at opposite ends of a cylindrical body portion, one of the flange portion having a groove in which an insertion groove for inserting a coil terminal therein and other flange portion having a coil terminal engaging portion. The electric motor also comprises a coil terminal having one end engaged with the engaging portion and the other end connected to an external connection terminal, and a stator coil which is wound on the bobbin and connected between the coil terminal bend turn portion and the engaging end portion.

According to another embodiment of the present invention, the one end of the coil terminal includes a projection for securing the coil terminal to the engaging portion of the bobbin flange.

BRIEF DESCRIPTION OF THE DRAWINGS

The present invention will become more readily apparent from the following detailed description of the preferred embodiment of the present invention taken in conjunction with the accompanying drawings, in which.

DESCRIPTION OF THE PREFERRED EMBODIMENTS

Figure 1:
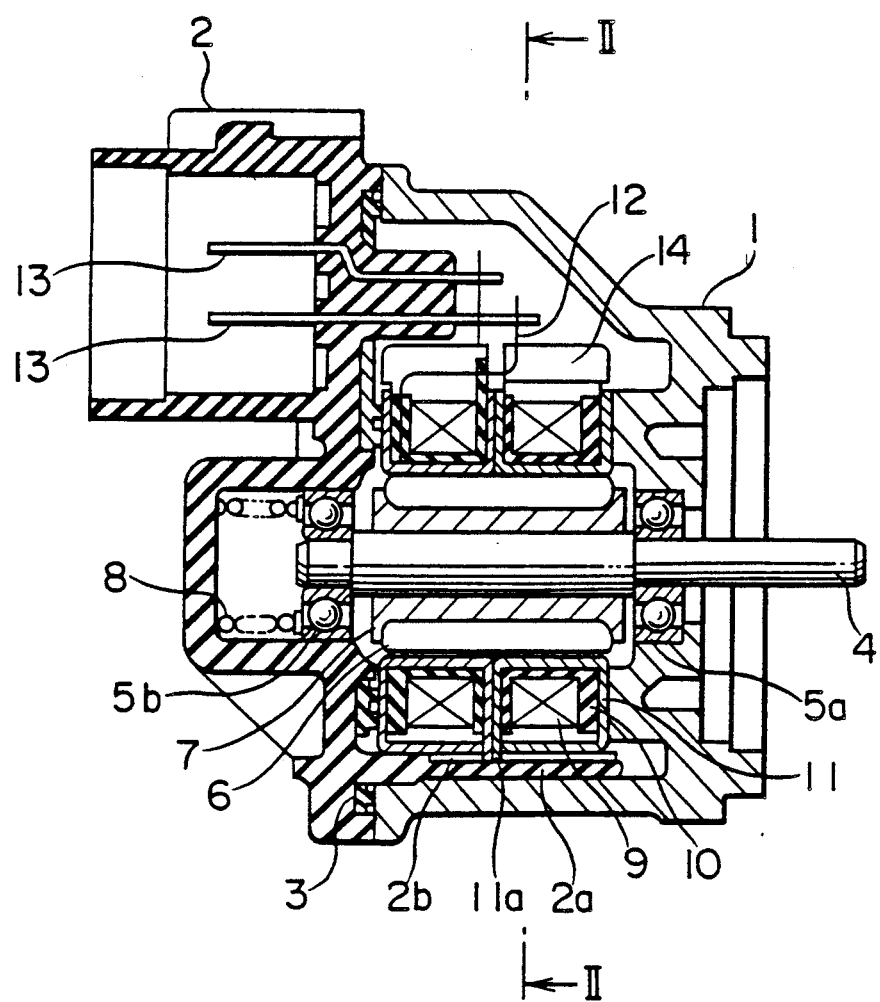
FIG. 1 is a sectional side view showing one embodiment of the small-sized electric motor of the present invention.
Figure 2:
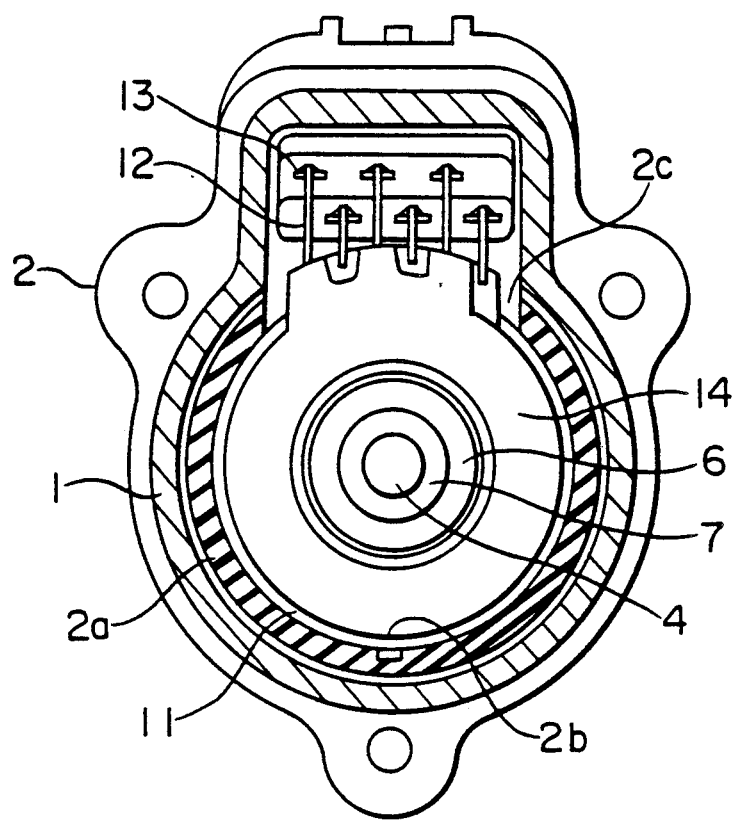
FIG. 2 is a sectional front view taken along line II—II of FIG. 1.

Referring now to FIGS. 1 and 2 of the drawings, in which one embodiment of the electric motor of the present invention is illustrated, the electric motor comprises a housing 1 and an electrically insulating cover 2 attached to the rear end of the housing 1 with a packing 3 inserted therebetween. A rotor shaft 4 which is an output shaft is rotatably supported by the housing 1 and the cover 2 through bearings 5a and 5b, respectively. The rotor shaft 4 has mounted thereon magnets 6 coaxially secured by a mold 7. A compression spring 8 is disposed between the bearing 5b and the cover 2 in order to absorb the play of the rotor shaft 4 in the axial direction. The electric motor also comprises a stator coil assembly supported by the housing 1. The stator coil assembly comprises stator coils 9 wound around bobbins 10 and arranged around the rotor magnets 6 with a predetermined gap therebetween. The assembly also includes a stator core 11 for defining a magnetic circuit for the magnetic flux generated by the stator coils 9. The stator coils 9 have coil terminals 12 for connecting the coil to an external circuit.

The cover 2 comprises a guide cylinder 2a integrally extending from the inner surface of the cover 2 for surrounding and supporting the coils 9, the coil bobbins 10 and the stator core 11 in a coaxial relationship with respect to the rotor shaft 4. The guide cylinder 2a has formed therein an axially extending guide groove 2b with which a projection 11a of the stator core 11 engages for positioning the magnetic poles of the stator core 11 at equal pitch. The guide cylinder 2a also has formed therein a slit or an opening 2c, through which the coil terminal 12 extends so that it can be connected to the external connection terminal 13. The coils 9 as well as the coil terminals 12 are protected by a mold 14.

During assembly, the bearings 5a and 5b are fitted onto the rotor shaft 4, and the coil bobbins 10, the coils 9 and the coil terminals 12 are assembled together into one unit by the mold 14, and the stator core 11 is attached to this assembly. Then, the packing 3 and the above assembly of the components disposed on the stator side are assembled to the cover 2. During this assembly, the guide cylinder 2a, the guide groove 2b and the projection 11a together serve as positioning means for the components so that the coil terminals 12 extending from the opening 2c are in suitable position aligned with the external connection terminals 13 so that the coil terminals 12 and the external connection terminals 13 can be connected by soldering. Then, the compression spring 8 is installed onto the cover 2 and the rotor shaft 4 is assembled to the cover 2, and finally the housing 1 is fitted to the cover 2 to complete the assembly of the electric motor.

Figure 5:
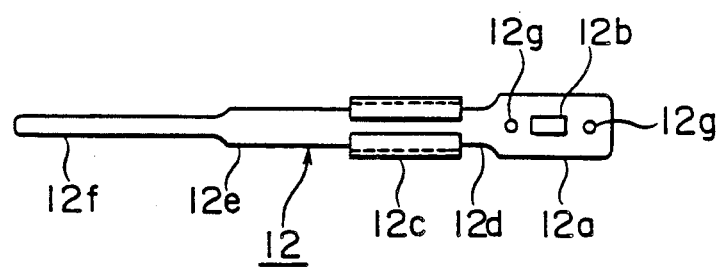
FIG. 5 is a plan view of the coil terminal of the present invention.
Figure 6:
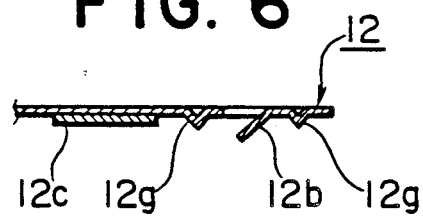
FIG. 6 is a sectional side view of the coil terminal taken along line VI—VI of FIG. 5.

FIGS. 5 and 6 are a plan view and a sectional view, respectively, of the coil terminals 12 shown in FIGS. 1 and 2. As seen from these figures, the coil terminal 12 comprises an insertion portion 12a having formed therein an engagement tab 12b partially cut and raised from the flat main body of the insertion portion 12a and two projections 12g formed by press. The insertion portion 12a is connected to a coil connection portion 12c through a bending portion 12d. The coil connection portion 12c is formed by bending over a pair of side extensions to form a channel section having a substantially "C"-shaped cross section. The coil terminal 12 further comprises a support portion 12e connected to the coil connection portion 12c and an elongated relatively narrow external connection portion 12f. The support portion 12e is the portion which is inserted into and engaged by notches 10c formed in the coil bobbin 10 when assembled.

Figure 7:
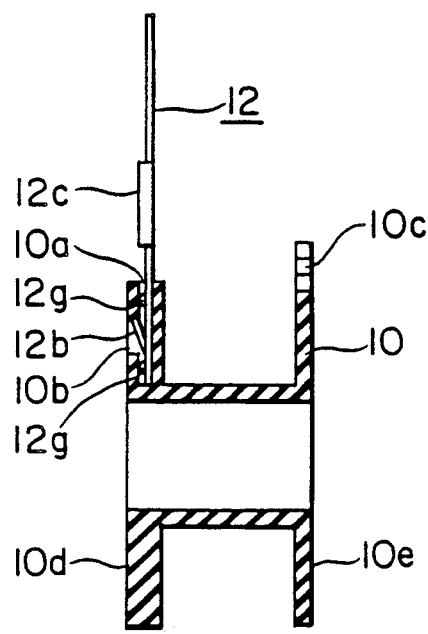
FIG. 7 is a sectional view showing how the coil terminal of the present invention is attached to the coil bobbin.

As best seen in FIG. 7, the coil bobbin 10 comprises two flanges 10d and 10e. it is seen that the flange 10d on the left in FIG. 7 has formed therein a radially extending slot 10a having a window 10b into which the engaging portion 12a of the coil terminal 12 is inserted and the engaging tab 12b engages the edge of the window 10b. The projections 12g formed on the engaging portion 12a of the coil terminal 12 engages the inner surface of the radial slot 10a, in order to prevent chattering and movement of the coil terminal 12 within the slot 10a. The other flange 10e on the right in FIG. 7 has formed therein the engagement notch 10c (also see FIG. 4) in which the support portion 12e of the coil terminal 12 is inserted and held therein.

Figure 3:
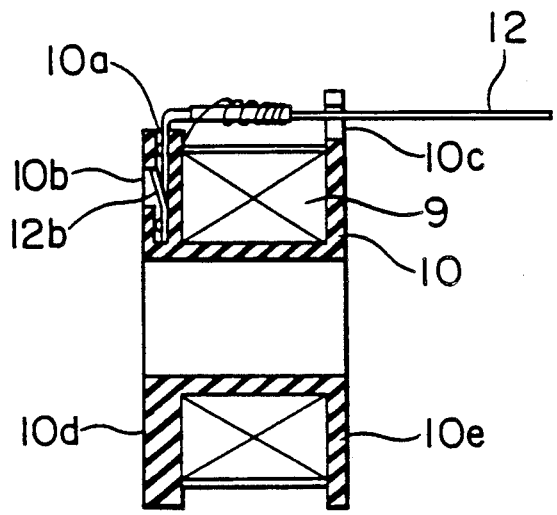
FIG. 3 is a sectional side view of the coil assembly of the stator of the motor of the present invention.
Figure 4:
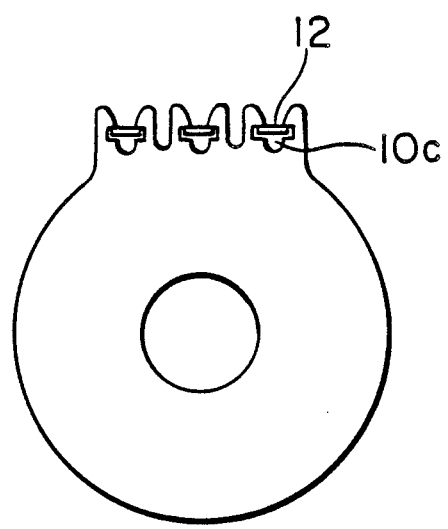
FIG. 4 is a front view of the coil assembly shown in FIG. 3.

In assembly, the insertion portion 12a of the coil terminal 12 is forced into the radial slot 10a until the engaging tab 12b fits into the window 10b of the flange 10d by the spring action of the tab 12b as shown in FIG. 7. It is seen that the projections 12g are in contact with the inner surface of the radial slot 10a. An end of the coil conductor is wound on the coil connecting portion 12c of the coil terminal 12 and the coil conductor is wound around the coil bobbin 10 to form the coil 9 by an automatic winding machine (not shown). Then, the coil terminal 12 is bent at the bending portion 12d to extend along the axis of the coil 9 and the support portion 12e is inserted into and held by the engagement notch 10c formed in the other flange 10e of the bobbin 10 as shown in FIGS. 3 and 4. Thereafter, the external connection portion 12f of the coil terminal 12 passed through the engagement notch 10c is bent in the radial direction and is connected to the external connection terminal 13. The end of the coil conductor wound around the coil connection portion 12c is soldered to the coil connection portion of the coil terminal 12.

According to the above-described embodiment of the present invention, the coil 9 can be wound on the bobbin 10 with the coil terminal 12 maintained in the radially extending position, so that an automatic winding machine can be used to wind the coil 9 on the coil bobbin 10. Also, since the insertion portion 12a of the coil terminal 12 has the engagement tab 12b which engages the window 10b of the bobbin flange 10d, attachment of the coil terminal 12 to the coil bobbin 10 is very simple. Also, since the coil terminal 12 is supported at the support portion 12e by the engagement notch 10c of the flange 10e of the bobbin 1, the coil connecting portion 12c does not move, causing no breakage of the coil conductor. Further, the insertion portion 12a of the coil terminal 12 is press fit into the radial slot 10a of the flange 10d of the coil bobbin 10 with the projections 12g in engagement with the inner surface of the radial slot 10a, no chattering is generated therebetween, making the connection between the coil 9 and the coil terminal 12 reliable. Also, since the contacts between the projections 12g and the inner surface of the radial slot 10b are point contacts, the force necessary for inserting the insertion portion 12a of the coil terminal 12 into the radial slot 10b is much smaller than that in the case where the entire thickness or width of the insertion portion 12a is increased. Also, the deformation of the coil terminal 12 is less likely to occur.

Figure 8:
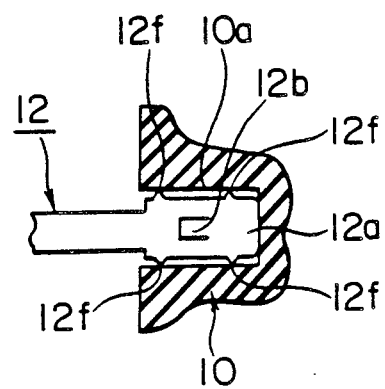
FIG. 8 is a fragmental view showing how the second embodiment of the coil terminal of the present invention is attached to the coil bobbin.

FIG. 8 illustrates a modification of the insertion portion 12a of the coil terminal 12, in which the insertion portion 12a is provided with projections 12g laterally extending from the side edges of the insertion portion 12a so that they are brought into contact with the side wall surfaces of the radial slot 10a. These projections 12 also serve to increase the effective width of the portion 12a for preventing the chattering or the movement of the coil terminal 12 within the radial slot 10a.

As has been described, according to the present invention, the electric motor, which includes a rotor having a permanent magnet and a stator having a stator coil disposed around the rotor, comprises a bobbin having a flange portion at opposite ends of a cylindrical body portion, one of the flange portions having a groove in which an insertion groove for inserting a coil terminal therein and other flange portion having a coil terminal engaging portion. The electric motor also comprises a coil terminal having one end engaged with the engaging portion and the other end connected to an external connection terminal, and a stator coil which is wound on the bobbin and connected between the coil terminal bend turn portion and the engaging end portion. According to another embodiment of the present invention, the one end of the coil terminal includes a projection for securing the coil terminal to the engaging portion of the bobbin flange.

Therefore, the coil winding operation can be easily and reliably achieved by an automatic winding machine, and the reliability or the product quality can be increased and the manufacturing cost can be reduced and also the breaking of the coil conductor can be prevented.

What is claimed is:

1. An electric motor including a rotor having a permanent magnet and a stator having a stator coil disposed around the rotor, said stator comprising:

a coil bobbin (10) having first (10d) and second (10e) flange portions at respective opposite sides of a cylindrical body portion thereof, said first flange portion having a slot (10a) and said second flange portion having an engagement notch (10c); and a coil terminal (12) having an insertion portion (12a), an external connection portion (12f) and a bending portion (12d) disposed between said insertion and external connection portions, a width of said bending portion being less than a width of said insertion portion so that said bending portion can be bent relative to said insertion portion, said insertion portion being disposed in the slot of said first flange portion, and said bending portion being bent relative to said insertion portion so that said external connection portion is disposed through the engagement notch of said second flange;

the stator coil being wound on said coil bobbin and being connected to a coil connection portion of said coil terminal.

2. The electric motor as defined in claim 1, wherein the insertion portion of said coil terminal further includes an engagement tab (12b), and wherein said first flange further includes a window (10b), said engaging tab being engaged at an edge of said window.

3. The electric motor as defined in claim 2, wherein said engagement tab integrally extends from the insertion portion of said coil terminal.

4. The electric motor as defined in claim 2, wherein the insertion portion of said coil terminal includes projections.

5. The electric motor as defined in claim 4, wherein said projections comprise first and second projections, said engagement tab being disposed between said first and second projections.

6. The electric motor as defined in claim 1, wherein the insertion portion of said coil terminal includes projections which laterally extend from side edges thereof so that said projections contact inner side wall surfaces of said slot.

7. The electric motor as defined in claim 6, wherein said projections comprise first and second pairs of projections (12g) and the insertion portion includes first and second opposite side edges, said first pair of projections laterally extending from the first side edge, and said second pair of projections laterally extending from the second side edge.

8. The electric motor as defined in claim 1, wherein a width of said external connection portion is less than the width of said bending portion.

* * * * *